United States Patent [19]

Miller

[11] Patent Number: 4,718,537
[45] Date of Patent: Jan. 12, 1988

[54] FEEDER HEAD ASSEMBLY

[75] Inventor: Charles P. Miller, McHenry, Ill.

[73] Assignee: Miller Formless Co., Inc., McHenry, Ill.

[21] Appl. No.: 750,418

[22] Filed: Jun. 28, 1985

Related U.S. Application Data

[63] Continuation-in-part of Ser. No. 672,151, Nov. 16, 1984, which is a continuation of Ser. No. 414,383, Sep. 2, 1982, abandoned.

[51] Int. Cl.[4] ............................................. B65G 67/58
[52] U.S. Cl. .................................. 198/513; 414/139; 414/140; 414/133; 414/320; 198/668; 198/314; 37/DIG. 20; 37/81
[58] Field of Search ............... 198/513, 519, 512, 514, 198/515, 668, 314, 518; 414/137–140, 144, 145, 313–320, 133, 390, 391; 37/DIG. 20, 257, 254, 81

[56] References Cited

U.S. PATENT DOCUMENTS

| | | | |
|---|---|---|---|
| 1,421,787 | 7/1922 | Kininmonth . | |
| 2,284,550 | 5/1942 | Adams | 37/DIG. 20 X |
| 2,568,402 | 9/1951 | Lynn | 37/DIG. 20 X |
| 2,712,186 | 7/1955 | Focher | 37/81 |
| 2,808,920 | 10/1957 | Silver | 198/314 |
| 3,223,256 | 12/1965 | Buschbom | 414/320 X |
| 3,836,019 | 9/1974 | Aralt . | |
| 3,857,499 | 12/1974 | Harbolt et al. | 414/144 |
| 3,891,079 | 6/1975 | Roper | 414/139 X |
| 4,019,641 | 4/1977 | Merz . | |
| 4,020,953 | 5/1977 | Eklöf et al. | 414/139 |
| 4,286,909 | 9/1981 | Tingskog | 414/144 |
| 4,334,818 | 6/1982 | Tingskog | 414/139 |

FOREIGN PATENT DOCUMENTS

| | | | |
|---|---|---|---|
| 2517285 | 6/1983 | France | 414/319 |
| 55-188673 | 7/1982 | Japan | 414/145 |
| 57-114783 | 7/1982 | Japan . | |
| 8401562 | 4/1984 | PCT Int'l Appl. . | |
| 861505 | 9/1981 | U.S.S.R. | 37/81 |

*Primary Examiner*—Frank E. Werner
*Attorney, Agent, or Firm*—Neuman, Williams, Anderson & Olson

[57] ABSTRACT

A feeder head assembly is provided which includes a single pair of augers which collect bulk material contained within a vessel. These augers advance the material to a lifting conveyor. A frame pivotally mounted to a rotatable enclosure portion of the lifting conveyor supports the augers on opposite sides of the conveyor with one end of each auger disposed proximate to the open lower end of the conveyor. Hydraulic motors disposed on the frame drive the augers. The assembly includes springs which bias the frame and augers to a perpendicular relation with the lifting conveyor whereby the assembly automatically adjusts to the configuration of the material and the bottom of the vessel.

15 Claims, 7 Drawing Figures

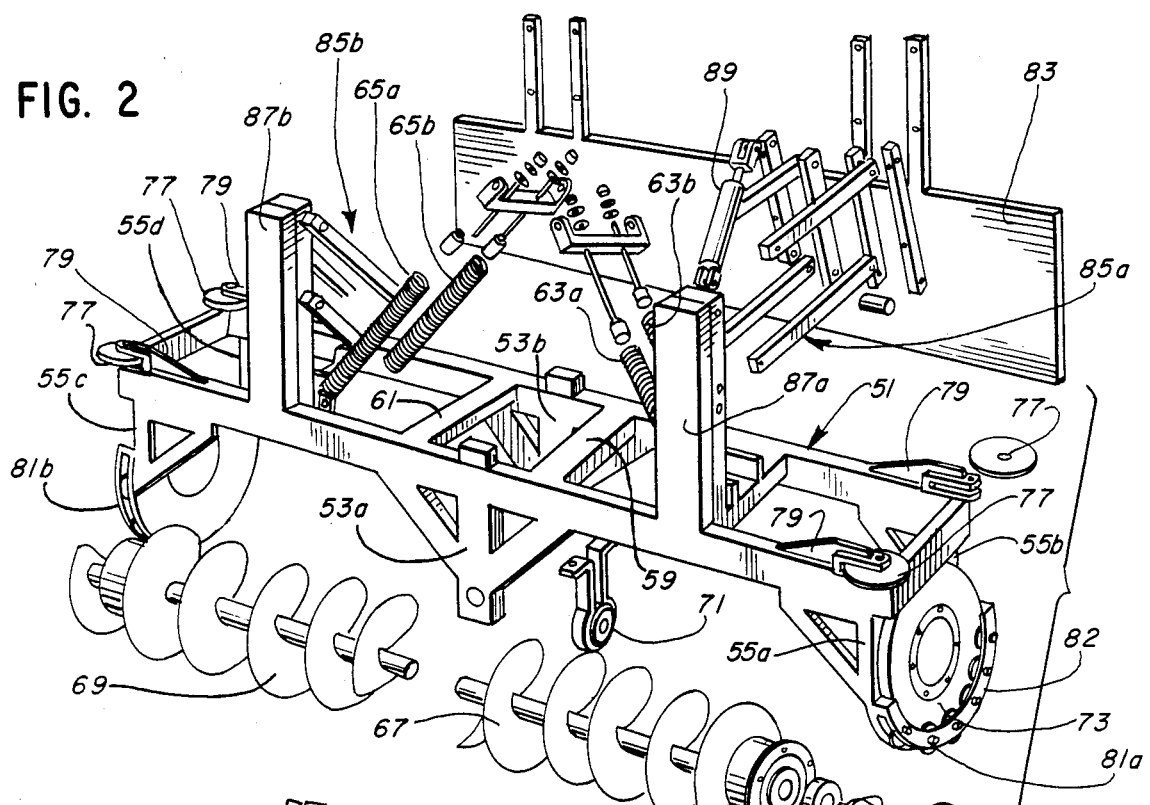
FIG. 2
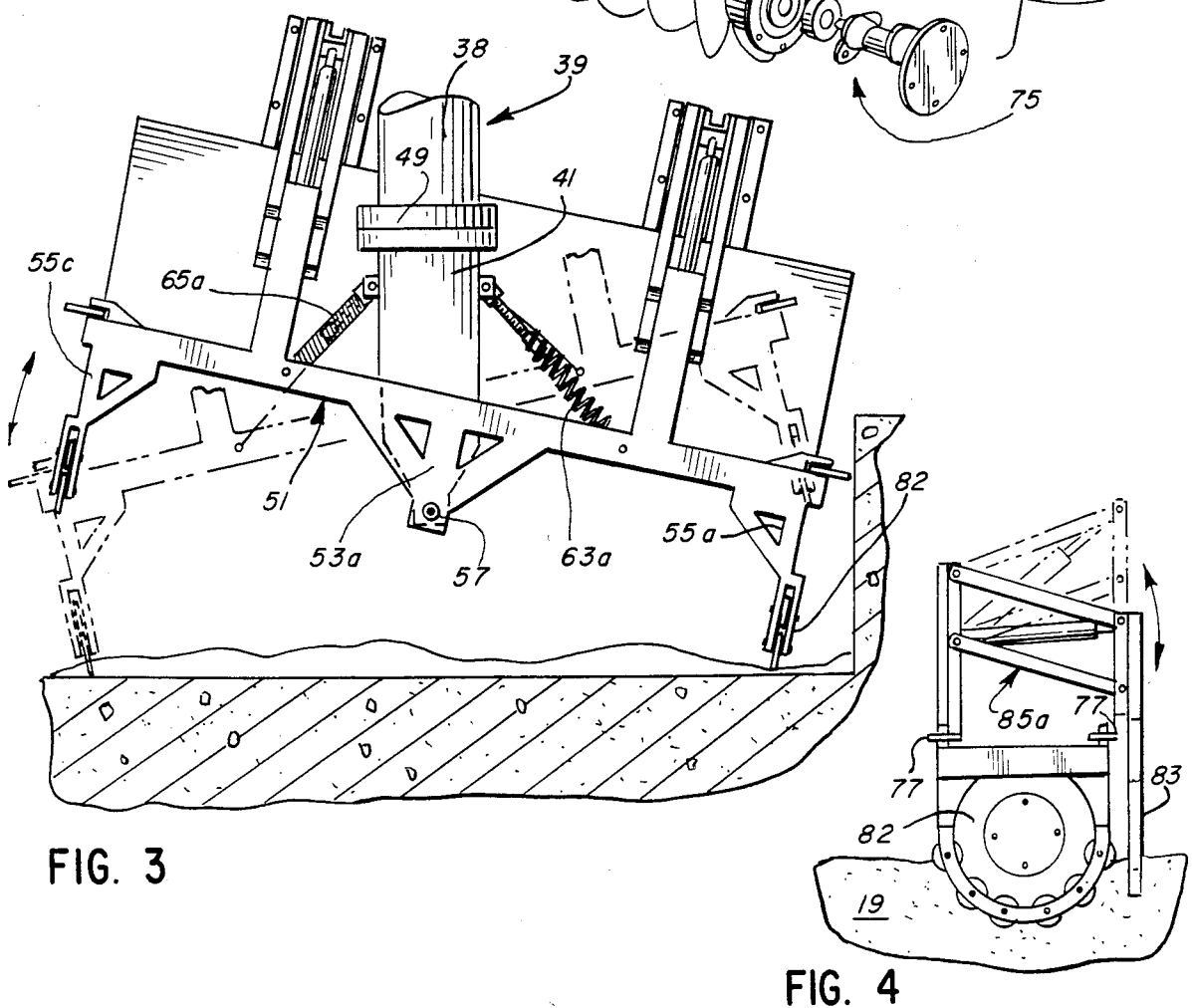
FIG. 3
FIG. 4

FEEDER HEAD ASSEMBLY

This application is a continuation in part of application Ser. No. 672,151, filed Nov. 16, 1984, for an "Apparatus And Method For Unloading Bulk Materials." application Ser. No. 672,151 is a continuation of application Ser. No. 414,383, filed Sept. 2, 1982, now abandoned.

BACKGROUND OF THE INVENTION

The present invention relates to a feeder head assembly used in conjunction with an unloading apparatus to transfer bulk materials, particularly pulverized or comminuted materials, from relatively large cargo containers or vessels to a material transport, handling or storage system. More particularly, this invention relates to a feeder head assembly used in conjunction with an unloading apparatus to transfer dry cement or other bulk, powdered material from cargo containers or vessels to a material transport, handling or storage system.

The transfer of various comminuted materials presents difficult problems. However, Portland cement, because of its physical properties, is particularly troublesome. Dry cement is a fine powdered material, 100 mesh or smaller in size. When moved and handled in bulk form, it presents dust problems. It is mildly abrasive, and it flows relatively freely at an angle of repose of 35° to 40°. When aerated it becomes fluid-like, but when packed or settled it becomes dense and difficult to handle. Large masses of cement present additional handling problems. Upon removal of a portion of a large mass of cement beyond the angle of repose of the remaining mass, the remaining mass shifts, changing its surface configuration.

The equipment used to unload the cement must first engage the cement, collect it and then move it out of the cargo container or vessel while controlling the dust. The collecting and feeding apparatus must have a certain degree of flexibility. It must adjust to the configuration of a mass of cement so that it may engage the cement and advance into the sloping sides of the mass. In addition, it must adjust to the configuration of the floor and walls of the vessel that it unloads.

Although increased flexibility provides desirable advantages, it usually results in increased complexity of the equipment. Such unloading equipment also tends to be large and heavy, and thus it is capable of causing damage to itself, the vessel and surrounding structures. However, the unloading equipment must be simple and easy to operate. In addition, it should preferably be self adjusting. Furthermore, it should minimize the risk of damage from improper and careless operation. Finally, the apparatus should be durable to resist the abrasive properties of the cement.

The feeder head assembly of the present invention used in conjunction with a mobile unloading apparatus fulfills the above requirements. It is simple, flexible, durable and mobile. It allows the unloading apparatus to engage the cement and to smoothly, cleanly and efficiently remove it from any location in the cargo container or vessel. Moreover, it includes features which minimize the risk of damage from improper or careless operation.

OBJECTS OF THE INVENTION

It is an object of the present invention to provide a feeder head assembly which fulfills the requirements stated above.

It is a further object of this invention to provide an improved feeder head assembly for a mobile unloading apparatus which removes bulk material from a cargo container or vessel.

It is another object of this invention to provide a feeder head assembly with a simple, durable and flexible construction.

It is yet another object of this invention to provide an improved feeder head assembly for a mobile unloading apparatus which gathers or collects cement in a cargo container or vessel and advances it to a conveyor which removes it from the vessel.

It is a more specific object of this invention to provide a feeder head assembly with sufficient flexibility to automatically adjust to variations in the configuration of the mass of cement and of the vessel so that it may engage, collect, and remove the cement.

It is yet another object of this invention to provide a feeder head assembly with features which minimize the risk of damage from improper or careless operation.

Other objects, advantages and features of the present invention will become apparent upon reading the following detailed description and appended claims, and upon reference to the accompanying drawings.

SUMMARY OF THE INVENTION

In accordance with one embodiment of this invention, a feeder head assembly which achieves the foregoing objects includes two opposed screw augers whose axes of rotation are co-linear. These augers collect bulk material contained in a vessel or other container and advance it to a lift conveyor between the augers. The lift conveyor lifts the material and removes it from the container, and also normally supports the feeder head assembly.

An elongated feeder head frame is pivotally mounted to the lifting conveyor and supports the collector augers. Suitable mounting devices maintain each auger longitudinally of the frame and hydraulic motors mounted to the frame drive the augers. The assembly also includes biasing means comprising a set of springs or coils having one of their ends pivotally mounted to the lifting conveyor and their other ends to the frame. These springs bias the frame and the augers to a predetermined relation with the lifting conveyor. The orientation of the lifting conveyor during operation is generally along a vertical axis. The springs bias the frame and augers toward a position where the augers are perpendicular to the lifting conveyor, i.e., normally horizontal. The pivot connection between the frame and the lifting conveyor and the springs give the feeder head assembly flexibility so that it may adjust to the configuration of the cement mass and the walls, and particularly the floor, of the container. This flexibility also allows the augers of the feeder assembly initially to accommodate itself to a sloping surface of the cement mass and advance into the mass with a bias from the springs to gradually and automatically return to the normal horizontal position. Thus, as it removes the cement, the feeder head assembly adjusts itself so that the augers again become perpendicular to the lifting conveyor.

The assembly also includes stops which consist of frame crossmembers which engage the lifting conveyor to limit the pivoting motion of the frame. In addition, rollers mounted on the frame allow bumping of the assembly into the sides and bottom of the container and movement of the assembly in contact with those surfaces without damaging the assembly or the container.

BRIEF DESCRIPTION OF THE DRAWINGS

For a more complete understanding of this invention one should now refer to the embodiment illustrated in greater detail in the accompanying drawings and described below by way of an example of the invention. In the drawings:

FIG. 2 is an exploded view of the feeder head assembly of FIG. 1.

FIG. 3 is a front elevation view of the feeder head assembly without the collecting augers, showing the assembly in a clockwise tilted position and, with phantom lines, in a counterclockwise tilted position.

FIG. 4 is an end elevation view of the feeder head apparatus of the present invention.

While the following disclosure describes the invention in connection with the preferred embodiment one should understand that the invention is not limited to this embodiment. Furthermore, one should understand that the drawings are not to scale and that the embodiment is illustrated in part by graphic symbols, diagrammatic representations, and fragmentary views. In certain instances, the disclosure may not include details which are not necessary for an understanding of the present invention such as conventional details of fabrication and assembly.

DETAILED DESCRIPTION OF THE DRAWINGS AND A PREFERRED EMBODIMENT

Figure 1:
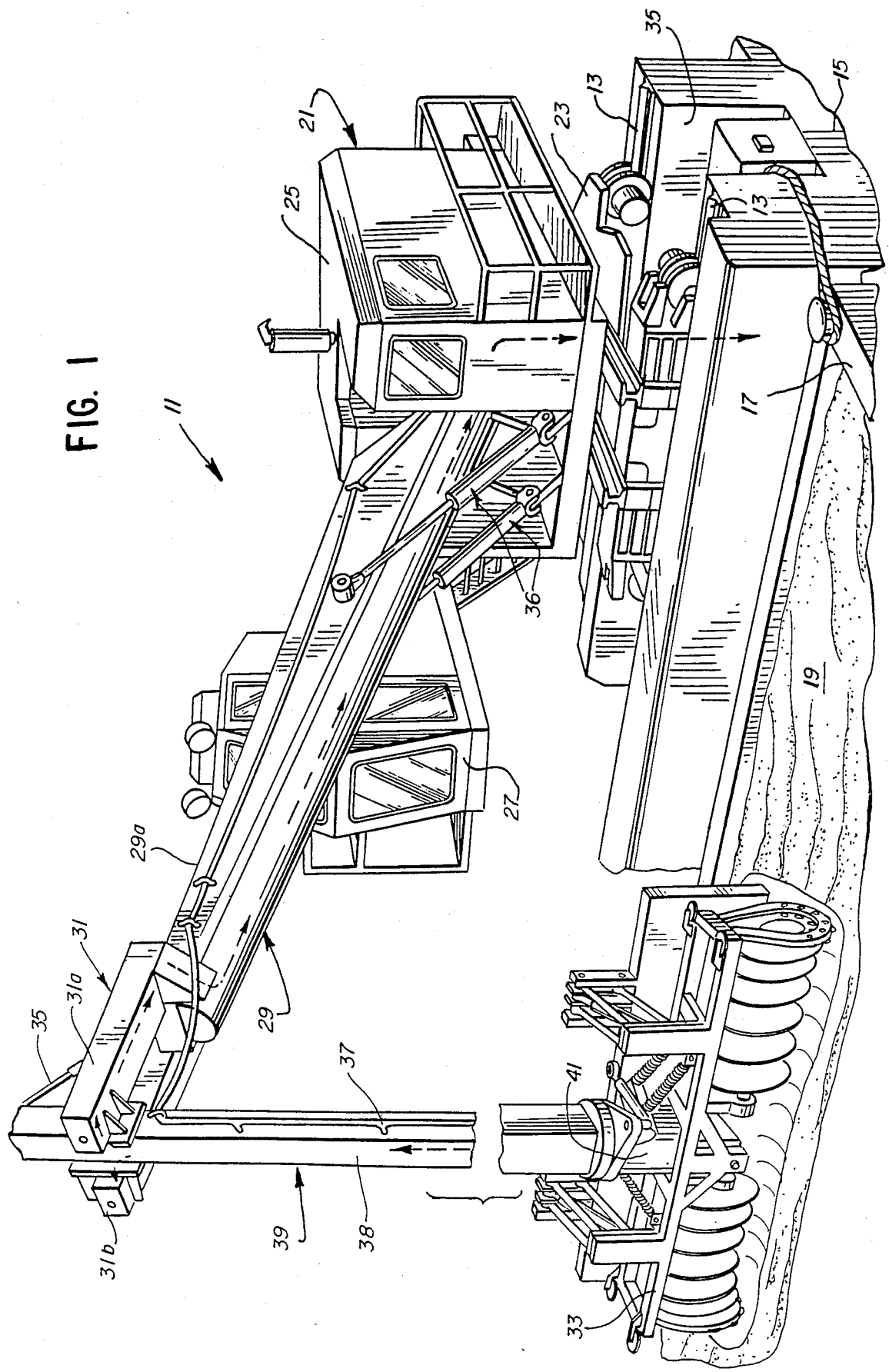
FIG. 1 is a perspective view of an unloading apparatus which includes a feeder head assembly that employs the present invention. This figure shows the feeder head assembly of the present invention slightly enlarged for emphasis. The aforementioned parent copending application Ser. No. 672,151 discloses the unloading apparatus in greater detail and that disclosure is incorporated herein by reference.

Turning now to the drawings, FIG. 1 illustrates a material unloading apparatus 11 mounted on two rails 13 of a dock structure 15 for unloading a barge 17 which contains dry Portland cement or other powdered material 19. The unloading apparatus 11 generally comprises: a support means 21 which includes a carriage means 23 for moving the support means on the rails 13, a power drive unit within housing 25, and control apparatus in an operator's cab 27 for controlling the operation of the unloading apparatus; a first conveyor 29 which conveys the dry cement to the support means 21; a second conveyor 31, including bifurcated structural support and conveyor sections 31a and 31b, which conveys the dry cement to the first conveyor 29; an uplift conveyor 39 which advances cement to the second conveyor 31; and a feeder head assembly 33 for gathering the cement from the pile of bulk material 19 in the barge 17 and advancing it to the uplift conveyor 39. As noted above copending application Ser. No. 672,151 discloses the unloading apparatus 11 in greater detail.

The unloading apparatus 11 moves back and forth on the rails 13 over a channel or pit 35 of the dock structure 15, with the power unit and supported conveyor system also being rotatable (about a vertical axis) relative to the carriage 23 on which it is movably supported in the manner of a crane or a backhoe. The channel 35 contains a conveyor assembly which receives the cement from the unloading apparatus 11 after the unloading apparatus has removed it from the barge. Copending application Ser. No. 581,284, filed Feb. 17, 1984, for a "Conveyor System Used With Apparatus For Unloading Bulk Materials", now U.S. Pat. No. 4,605,116 and Ser. No. 705,545, filed Feb. 26, 1985, for a "Material Transfer Assembly", now U.S. Pat. No. 4,658,948 disclose, in greater detail, a conveyor assembly which may be disposed in channel 35 and a transfer assembly for transferring the cement from the unloading apparatus 11 to the conveyor assembly. Those applications are incorporated herein by reference.

As stated above, the first conveyor 29 receives the dry cement or other bulk material from the second conveyor 31. A boom 29a supports the first conveyor 29 and the second conveyor 31. Appropriate connecting means maintain the first and second conveyors and the uplift conveyor in a common plane, pivotally mount the uplift conveyor 39 to the distal end of the second conveyor 31, and support the uplift conveyor generally along a vertical axis from that end. However, an extendible hydraulic cylinder unit 35 may selectively tilt the uplift conveyor 39 at an angle to this vertical axis and maintain the uplift conveyor at a desired relative tilt position. The boom 29a is pivotally supported at its base end on support means 21 and is angularly adjustable in a vertical plane by hydraulic support cylinder unit 36.

The uplift conveyor 39 is a screw auger conveyor, as are the first conveyor 29 and the second conveyor 31. A suitable hydraulic motor drives it. Hydraulic motors, known in the art, drive each of the augers used in the unloading apparatus 11 and the feeder head assembly 33. To aerate the cement along the uplift conveyor, the unloading apparatus 11 includes means 37 for injecting compressed air into the cement. The injecting means 37 includes suitable flexible tubing, nozzles and controls for injecting the air.

Figure 5:
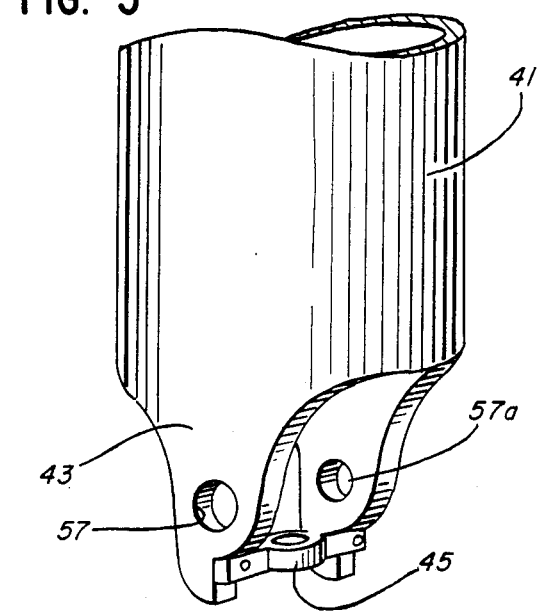
FIG. 5 is a perspective view of the bottom end of the enclosure for the uplift conveyor of the feeder head assembly.

The uplift conveyor 39 includes a bottom housing 41 and a top housing 38. The bottom housing 41 is rotatably mounted to the top housing 38. (See also FIGS. 3 and 5 through 7). The housings serve as structural support members for the feeder as well as being the conveyor housing. These functions could be separated into separate components. The uplift conveyor 39 receives the cement gathered by the feeder head assembly 33 at the bottom or intake end of housing 41 and conveys it to the second conveyor 31. The uplift conveyor 39 includes a screw auger 40. The open bottom of the housing 41 of the uplift conveyor 39 includes a pair of downwardly projecting integral legs 43 located at opposite sides of the enclosure 41 (See FIG. 5). The legs 43 support a bearing 45 which extends between the two legs 43 and mounts the uplift auger for rotation in the enclosures 38 and 41. The bottom portion of the enclosure 41 has the configuration shown in FIG. 5 to expose the bottom end of the uplift auger. Exposed, the lower end portion of auger 40 may effectively engage the cement that the feeder head assembly accumulates and advances into it.

The bearings used in the conveyors of the unloading apparatus 11 and the feeder head assembly 33 are those described in copending application Ser. No. 672,151. They comprise a hard iron cylindrical race with a hardened steel shaft passing through the race. The shaft fits loosely in the race, allowing cement to fill the space between the shaft and the race. The cement, thus, acts as a buffer to lubricate and cool the wearing surfaces.

The uplift auger 40 is a single or multi section, double flight auger which extends substantially along the entire length of conveyor 39. At the bottom end of the conveyor 39, within the bottom end of enclosure 41, the auger has a shorter pitch to provide a more efficient movement of cement by reducing slippage and to provide a more constant or even flow. The top portion of auger 40 advances the cement at a faster rate due to its greater pitch, and thus further aerates the cement and prevents it from packing. The auger has a substantially constant diameter along the length of the conveyor 39.

Figure 6:
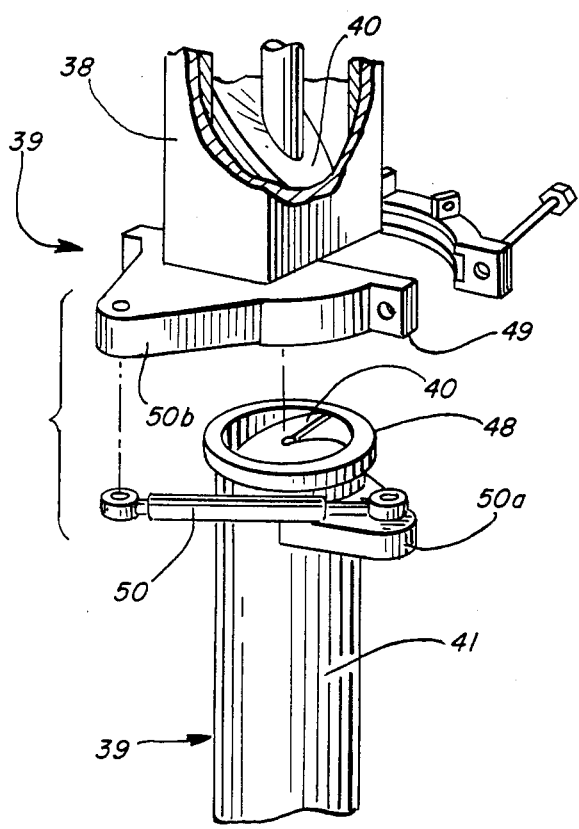
FIG. 6 is a perspective, partial cutaway view of a connection between the uplift conveyor of the feeder head assembly and the second conveyor of the unloading apparatus.

Referring to FIG. 6, the upper discharge end of the uplift enclosure 41 includes an annular collar with a flange 48 for selective rotational attachment to the top housing 38. The bottom or intake end of the top housing 38 includes a split hollow receiving collar 49 fixedly attached to the top housing. The collar 49 conforms to the annular flange 48 disposed around the top periphery or discharge end of the uplift conveyor. A bolt and nut set circumferentially clamps or compresses the collar 49 over the annular flange 48 of the enclosure 41 and rotatably retains it in dust tight relation so that the uplift enclosure 41 is colinear with the top housing 38. An extendible hydraulic cylinder unit 50 has one of its ends pivotally mounted to a radial arm 50a of the bottom housing or enclosure 41 and its other end to a radial arm 50b on the collar 49. Extension and retraction of this cylinder unit rotates the entire feeder head assembly 33 relative to the uplift conveyor 39, around the longitudinal axis of the conveyor assembly 39.

Figure 7:
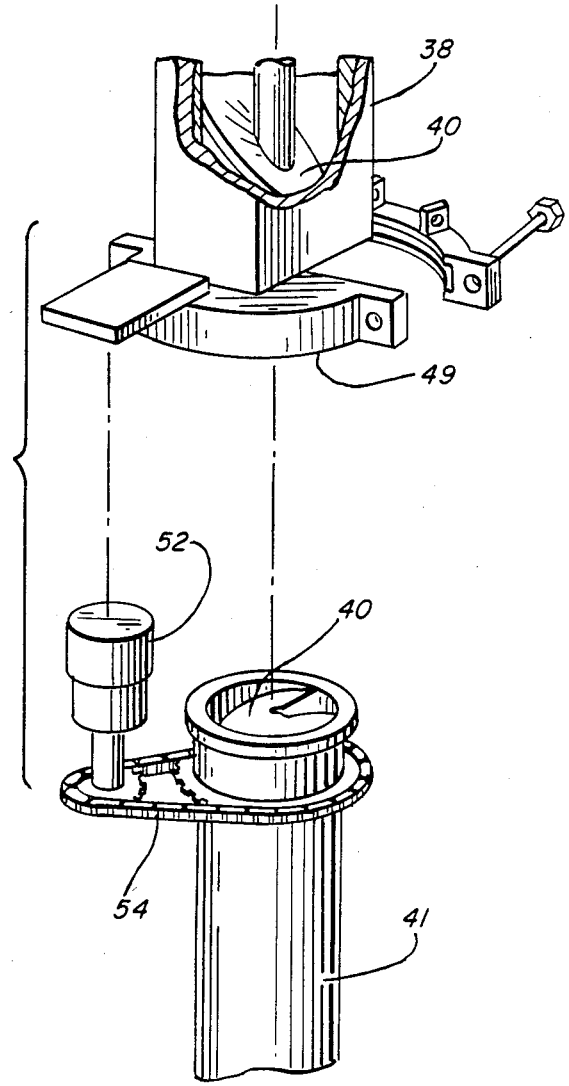
FIG. 7 is a perspective, partial cutaway view of the connection of FIG. 6, showing other means for rotatably adjusting the uplift conveyor.

Alternatively, referring to FIG. 7, the unloading apparatus 11 may include a hydraulic motor 52 mounted on the top housing 38 and a sprocket and chain drive 54 which operatively connects the motor with the bottom housing 41 so that the motor may rotate the bottom housing 41 and the feeder head assembly. (See FIGS. 2 and 3 of the copending application Ser. No. 672,151 and the corresponding portion of the specification of that application for a detailed description of such a connection between the second conveyor and the uplift conveyor). Although this alternative connection functions adequately, the connection having the hydraulic cylinder unit described above is the preferred connection since it is self-contained. This connection is not susceptible to loose material impeding its moving parts.

As stated above, the feeder head assembly 33 collects or accumulates the cement or other powdered material 19 contained in the vessel or barge 17. It advances this material to the uplift conveyor 39 which receives it and moves it up into the second conveyor 31.

Referring now to FIGS. 1 through 3, the feeder head assembly 33 includes an elongated frame 51 which is pivotally mounted on the enclosure 41 and supports the other components of the feeder head assembly. This frame is a rectangular, platform-type structure with two longitudinal side members and a number of crossmembers. It includes six downwardly projecting legs with corresponding bracing members—legs 53a and 53b at the midpoint and on opposite sides of the frame and legs 55a, 55b, 55c and 55d at the corners of the frame. These legs serve to connect the assembly augers and related components to the frame 51.

The enclosure 41 of the uplift conveyor 39 extends through the center of the frame 51. Pivot pin connections 57 at the lower ends of legs 53a and 53b pivotally mount the frame 51 to the uplift conveyor enclosure 41 by engaging pivot openings 57a in the enclosure leg portions 43 (See FIG. 5). The pivot connections allow the feeder head assembly to tilt or rotate in the manner shown in FIG. 3 about an axis "z", defined by the pivot points, i.e., to tilt laterally about the generally horizontal axis defined by these pivots. These connections maintain the elongated frame 51 and the uplift conveyor in a common plane as defined by the longitudinal axis of the uplift conveyor, axis "y", and the longitudinal axis which extends through the middle of the frame 51, axis "x".

The feeder head assembly may tilt or rotate clockwise or counterclockwise up to the limits defined by the enclosure 41 and the crossmembers 59 and 61. (See FIG. 2). The movement of the feeder head assembly 33 in the clockwise direction is limited by engagement of the crossmember 61 with the enclosure 41 to stop the assembly. (See FIG. 3.) In the counter-clockwise direction, the crossmember 59 serves as the stop. The enclosure 41 must have sufficient strength to absorb the force of the crossmembers 59 and 61 striking it. As on alternative to having the crossmembers 59 and 61 serve as stops, the feeder head assembly may include chain sections connected at one end to the frame 51 and at the other to the enclosure 41. Other limit stops may be provided.

The feeder head assembly includes automatic centering or balancing means comprising a first pair of tension springs, 63a and 63b, and a second pair, 65a and 65b. Appropriate connecting devices pivotally attach one end of each spring to the uplift enclosure 41 above frame 51 and the other to the frame 51 outward of the enclosure 41. These springs function to bias the assembly toward a position where the frame 51 is perpendicular to the uplift enclosure 41. The pivot connections at 57 and the yieldability of the springs allow the frame to adjust automatically to the surface angle of the mass of material to be unloaded and to the container. The frame 51 tilts, with increasing resistance to tilt, as the tilt angle (the included angle between the longitudinal axis of the frame 51 and the longitudinal axis of the conveyor 39) increases. Thus, it can adjust automatically so that it will be parallel to any firm surface which it contacts such as the bottom of the container. This feature also allows the feeder head assembly to tilt to effectively engage the surface material of a pile of bulk material which is at a substantial angle to the axis of the uplift conveyor 39, e.g., the angle of repose of cement. Concurrently, the springs urge the assembly to readjust itself to the normal horizontal position described above as it works its way into the pile of material.

The feeder head assembly 33 accumulates or. collects the cement and moves or advances it to the uplift conveyor 39 using two screw augers, 67 and 69. In the illustrated embodiment, the longitudinal axes of the augers 67 and 69 are colinear, substantially parallel to the frame 51, and in the same plane as the axis of auger 40, whereby their inward ends are in closely adjacent facing relation with the exposed lower end portion of the auger 40. Similar components mount the two augers to the frame in a similar manner; thus, the following description provides mounting details for auger 67 only. As seen in FIG. 2, a hanger bearing 71 mounted to the bottom of the cross frame member 59 and a mounting plate 73 at one end of the frame 51 support the auger 67 below the frame 51. The auger 67 is exposed on all sides so that it may efficiently engage and collect or gather the cement.

The hanger bearing 71 supports the inner end of the auger 67 proximate the bottom end of the uplift auger 40 of the uplift conveyor 39 so that the auger 67 may transfer the cement which it has gathered to the auger 40. The mounting plate 73 which supports the opposite end of the auger 67 is an annular plate fixedly attached to the legs 55a and 55b of the frame 51. It supports the outer end of the auger 67 and the hydraulic motor 75 which drives the auger.

The feeder head assembly typically is a large, heavy assembly, e.g. 12 feet long, 3 feet wide, 3 feet high and weighing 4500 lbs. It is manipulated at the end of long articulated supports 29, 31 and 39, and is capable of damaging itself, the vessel containing the cement and/or other structures. To reduce the risk of damage, and to facilitate smooth, accurate movement of the assembly along the walls and bottom of a vessel or other container, the feeder head assembly includes contact rollers rotatably mounted to the frame 51. For lateral movements which rely upon or result in contact with the sides of the container, the assembly includes rollers 77 mounted on vertical axes at each corner of the frame 51 by mounting brackets 79 with the peripheries of the rollers extending outward of the frame 51. For downward movements which rely upon or result in contact with and/or movement along the bottom of the container, the assembly includes two sets of rollers 81a and 81b oriented with their axes parallel to the longitudinal axis of frame 51. A semicircular bracket 82 fixedly secured to the bottom edge of each of the two auger mounting plates mounts the sets of rollers 81a and 81b to the frame 51. The rollers extend radially beyond the peripheries of the augers and allow the feeder head assembly to glance off the sides and/or bottom of the container and to be deliberately moved along the bottom in a clean-out operation without damaging the augers or the container. Instead of contact rollers, the assembly may use shock absorbing pads or bumpers to provide similar functions; however, the contact rollers are preferred.

The feeder head assembly also includes an independently operable scrapper plate 83 to assist in gathering the bulk material. Separated pairs of hinged arms form parallelogram linkages 85a and 85b which connect the scrapper plate 83 to posts 87a and 87b, respectively, and suspend the plate 83 over one edge of the frame 51. These linkages permit the plate to descend to a position at least as low as or slightly beyond the lowest portion of the augers 67 and 69. Thus, the bottom edge of the plate 83 may come into contact with the floor of the barge or container. (See FIG. 4). Extensible cylinders 89 raise and lower the plate 83. They have one of their ends pivotally mounted to the respective post 87a and 87b and the other end to plate 83.

Since a single set of collecting augers 67, 69 is used in the ilustrated feeder, the assembly need not be adjustable about an axis parallel to the longitudinal axis of the frame 51, i.e. axis "x" or in "pitch." As the angle of conveyor 39 to the vertical is changed during manipulation of the feeder, a lower portion of the periphery of the single auger set 67, 69 will remain parallel with the bottom of the container. The sets of rollers 81a and 81b extend over a substantial area, as best seen in FIG. 4, to accommodate this movement.

It will be seen that the illustrated feeder assembly will accommodate to widely varying surfaces of the material and to various angles of approach to the walls and bottom of the container, with only one power adjustment of the head assembly relative to the supports, namely: rotation about the axis of the conveyor 39. Adjustment in "pitch" is unnecessary and adjustment in lateral tilt is automatic.

Thus, a feeder head assembly has been modified which meets the aforestated objects. While the above description and the drawings disclose and illustrate one preferred embodiment, it should be understood, of course, that the invention is not limited to this embodiment. Those skilled in the art to which the invention pertains may make modifications and other embodiments employing the principles of this invention, particularly upon considering the foregoing teachings. For example, one skilled in the art may vary the position of the pivot axis for the feeder head assembly. In addition, one skilled in the art may also vary the orientation of the collecting augers. Therefore, by the appended claims, it is intended to cover any such modifications and other embodiments as incorporate those features which constitute the essential features of this invention.

What is claimed is:

1. A self-adjusting feeder head assembly for accumulating bulk material and moving the material into a movable lifting conveyor which is suspended above a mass of bulk material and which includes an elongated enclosure and means for lifting the bulk material through said enclosure, said feeder head assembly comprising: an elongated frame structure pivotally mounted to and suspended from the bottom distal end portion of said lifting conveyor for movement with said lifting conveyor and extending transversely of the longitudinal axis of said bottom distal end portion of said lifting portion; at least one auger disposed longitudinally of said frame rotatably mounted to said frame for accumulating and advancing said powdered material to said lifting conveyor, one end of said auger disposed proximate said enclosure; said frame being pivotable with respect to said lifting conveyor so that said frame and said auger remain in a common plane with said lifting conveyor; power means disposed on said frame for rotating said auger about its longitudinal axis; and non-powered biasing means disposed between said frame and said lifting conveyor for yieldably, resiliently and automatically biasing said frame and auger to a predetermined angular relationship with said lifting conveyor; said pivotal frame automatically adjusting and disposing said auger substantially parallel to the surface of said mass of material and said biasing means automatically adjusting and disposing said auger to a predetermined angular relationship with the lifting conveyor as said auger moves material to said lifting conveyor.

2. The feeder head assembly as in claim 1, wherein said biasing means comprise tension springs.

3. The feeder head assembly of claim 1, wherein said frame includes peripheral abutment means for protecting said assembly upon contact with other structures.

4. The feeder head assembly as in claim 3, wherein said abutment means comprise rollers rotatably mounted on said frame.

5. The feeder head as as in claim 4, including rollers extending horizontally beyond the periphery of said frame.

6. The feeder head assembly as in claim 4, wherein said abutment means include rollers at each end of said frame and extending vertically beyond the lowermost edge of said auger.

7. The feeder assembly as in claim 4, wherein said abutment means include a set of rollers at each end of said frame with the roller of each set disposed along an arc corresponding to the lower peripheral segment of said auger, and each of said rollers extending radially beyond the periphery of said auger.

8. The feeder head assembly of claim 1, wherein said frame includes stop means for limiting the pivoting movement of said frame relative to said lifting conveyor.

9. The feeder head assembly of claim 1, wherein said frame is an elongated structure and said auger is disposed longitudinally of said frame.

10. A self-adjusting feeder head assembly for accumulating bulk material removing the material into a movable lifting conveyor which is suspended above a mass of bulk material and which includes a rotatable enclosure and exposed lower portion of a lifting auger, said feeder head assembly comprising: an elongated frame structure pivotally mounted to and suspended from the bottom distal end portion of said rotatable enclosure of said lifting conveyor, for pivoting about a central transverse axis of said frame structure and wherein said transverse axis intersects said auger; first and second augers rotatably mounted on said frame structure and extending longitudinally of said frame structure on opposite sides of said conveyor, one end of each of said first and second augers disposed proximate said lifting conveyor for accumulating and advancing said bulk material into said lifting conveyor, said first auger disposed between said central transverse axis and one end of said frame structure and said second auger disposed between said central transverse axis of said frame structure and a second opposite end of said frame structure; said frame structure being pivotable with respect to said lifting conveyor so that said frame structure and said first and second augers remain in a common plane with said lifting conveyor; power means disposed on said frame structure for rotating said first and second augers about their longitudinal axis; and non-powered biasing means disposed between said frame structure and said lifting conveyor for yieldably, resiliently and automatically biasing said frame to a predetermined angular relationship with said lifting conveyor about said transverse axis; said pivotable frame automatically adjusting and disposing said first and second augers substantially parallel to the surface of said mass of material and said biasing means automatically adjusting and disposing said first and second augers to a predetermined angular relationship with the lifting conveyor as said augers move material to said lifting conveyor.

11. The feeder head assembly as in claim 10, wherein said biasing means comprise tension springs.

12. The feeder head assembly of claim 10, wherein said frame includes peripheral abutment rollers for protecting said assembly upon contact with the sides and bottom of a container from which bulk material is being removed by said feeder head assembly.

13. The feeder head assembly of claim 12, wherein said frame includes stop means for limiting the pivoting movement of said frame about said transverse axis.

14. The feeder head assembly of claim 10, wherein the longitudinal axis of said first auger is colinear with the longitudinal axis of said second auger, said enclosure of said lifting conveyor extends to the lower end of said lifting conveyor and is open to said first and second augers, and the inward ends of said first and second augers are in opposed adjacent relationship to the exposed lower portion of said lifting auger.

15. The feeder head assembly of claim 14, wherein said frame is fixed against tilting about an axis parallel to the longitudinal axis of said first and second augers.

* * * * *

UNITED STATES PATENT AND TRADEMARK OFFICE
CERTIFICATE OF CORRECTION

PATENT NO. : 4,718,537

DATED : January 12, 1988

INVENTOR(S) : Charles P. Miller

It is certified that error appears in the above-identified patent and that said Letters Patent is hereby corrected as shown below:

Column 1, line 31, "on" should read -- one --.

Column 6, line 62, delete the period after "or".

Column 9, claim 5, line 4, "as" first occurrence should read -- assembly --.

Column 9, claim 10, line 25, after "material" insert -- and --.

Signed and Sealed this

Ninth Day of August, 1988

Attest:

DONALD J. QUIGG

*Attesting Officer*          *Commissioner of Patents and Trademarks*